United States Patent [19]

Ekman

[11] 4,101,870
[45] Jul. 18, 1978

[54] DEVICE FOR INDICATING SPEED LEVELS FOR MOTOR VEHICLES

[76] Inventor: Adolphe Ekman, 19 rue Gustave, Delory Lille (Nord), France

[21] Appl. No.: 755,070

[22] Filed: Dec. 28, 1976

[30] Foreign Application Priority Data

Jan. 21, 1976 [FR] France .............................. 76.02073

[51] Int. Cl.$^2$ ............................................. G08B 19/00
[52] U.S. Cl. .................................. 340/53; 340/52 F; 340/576; 180/103 R
[58] Field of Search ................ 340/52 F, 53, 62, 279; 180/98, 99, 103, 105 R, 105 E, 106

[56] References Cited

U.S. PATENT DOCUMENTS 3,504,337  3/1970  Ekman ................................... 340/53

Primary Examiner—Alvin H. Waring
Attorney, Agent, or Firm—Robert E. Burns; Emmanuel J. Lobato; Bruce L. Adams

[57] ABSTRACT

In a method and device for indicating speed levels of a motor vehicle, the speed as well as danger factors are transformed into parameters, which are combined. Their combination is compared with a threshold value, for possible actuation of an alarm, after modulation of the danger factors in accordance with a safety factor dependent on characteristics of the vehicle and of its driver.

46 Claims, 5 Drawing Figures

DEVICE FOR INDICATING SPEED LEVELS FOR MOTOR VEHICLES

BACKGROUND OF THE INVENTION

The present invention relates to a method and a device for indicating speed levels, intended more especially for motor vehicles.

Experience shows that the safety conditions governing road traffic are closely linked to a large number of parameters, some of which are listed below:

the diversity of types of vehicles on the move at the same time, ranging from the light to the high performance private car and from the small delivery van to special transport vehicles, the very different capabilities of the drivers of these vehicles whose age, physical condition, general driving skills and experience are extremely varied;

widely diverse road networks consisting of varying widths, gradients and protection;

the density and fluidity of traffic, which depend partly on the proximity of large built-up areas, times of day, and partly on the time of year; and the considerable influence of weather conditions and visibility on traffic flow and braking conditions.

It would appear extremely difficult for any driver to be constantly aware of the interplay of these different parameters which affect his safety and that of all other road users, and a great many accidents arise solely from an error of judgement which causes him at a given moment to exceed a speed limit which is in line with safety target limits.

In order to try to find an answer to such accidents, authorities have found it necessary to control speed in the light of the quality of roads, and the length of time the driver has held a licence, but it would seem that these laws - applied uniformly to all vehicles and all classes of drivers - impose restrictions on experienced good drivers handling a well-kept high performance vehicle, yet at the same time encourage drivers who are inexperienced or lacking in skill to travel constantly at top speed even with light, low-powered cars, themselves often inadequately maintained and serviced.

We have recently seen the appearance on the market of speed level indicators with visual or audible alarm facilities, but the different devices of this type at present available are nothing more than extensions of already existing speedometers: the warning level is fixed arbitrarily by the driver, often depending on his mood and, if the truth were known, with the main object of avoiding prosecution and with no real concern for safety.

SUMMARY OF THE INVENTION

The purpose of the present invention is to inform at all times the driver of a car, coach, heavy truck or any other vehicle, depending on the type and nature of the transport effected (including in the case of coaches : school transport or exceptional journeys such as organised trips in foreign countries, etc., or in the case of heavy trucks : dangerous, harmful or explosive substances, fuel, etc..) as to the degree of safety of his vehicle. The invention does this in the light of the speed selected as compared with an optimum speed determined on the basis of:

the features and situations specific to the route being taken;

the weather conditions such as rain, high wind, icy roads;

the visibility conditions such as night, fog;

traffic density, affected for example by departure for and return from long week-ends, holidays, peak hours, etc;

the characteristics and mechanical performance of the vehicle itself, variable depending on its maintenance and degree of wear; and the competence and driving skills of the driver, together with his physical condition (age, reflexes, keenness of sight, etc.).

Thus continuously analysing a large number of danger factors so as to indicate to the driver a ceiling speed limit determined objectively and scientifically on the basis of these different factors, the appliance reassures the motorist and allows him to pay that much more attention to actually driving his vehicle. The use of such an instrument thereby provides better driving and safety conditions without arbitrarily imposing a uniform speed limit on all drivers whether driving conditions are good or otherwise, in all weathers, under all circumstances, on all classes of roads in the road network, yet at the same time varying its information to suit these factors by comparing the actual speed of the vehicle with a large number of top speed levels themselves memorized in the light of those factors.

Making wide use of electronics, the equipment as per the invention is of small size, making it easy to fit on any vehicle. It can be mass produced at low cost, making it accessible to most people.

It offers monitoring facilities ensuring a more rational use of all vehicles including those likely to be entrusted to different drivers, with particular reference to taxis, hire cars, coaches and lorries, since it is possible to produce it at least partially in the form of interchangeable units, of the plug-in type for instance, each of which is respectively characteristic of the vehicle including its age, the driver, the type of transport provided for, etc...

The actual immediate speed of a vehicle can be assessed by any appropriate sensor suitably arranged, notably by any detector of eddy currents or magnetic pulses which is easy to fit, for instance, on a speedometer case or supply source, or any other detector providing representative informaton as to frequency or value of the speed of the vehicle providing that this information can be transformed into "weak current" supplying the input of the basic circuit which is controlled by the numerous parameters which modulate the speed levels with which the speed of the vehicle is compared.

A first embodiment of the instrument can be used autonomously being operated by different selector keys which the driver actuates as and when traffic conditions change and by various detectors fitted at strategic points on the vehicle. A second embodiment of the instrument is additionally remote-controlled by conventional signal-emitting beacons installed along roads and thereby becomes fully automatic. The speed levels indication process as per the invention, intended more especially for a motor vehicle, has the special feature that the speed of the vehicle is translated into an electrical or other parameter with a value characteristic of the speed, each danger factor is translated into a parameter of like nature and with a conventional value, the values of the parameters are combined in a pre-determined manner, the value resulting from the combination is compared with at least one pre-determined threshold, and at least one alarm is initiated in the light of the comparison.

As regards the device as per the invention, this has the special feature that it comprises:
- a device which senses the speed of the vehicle at each moment,
- a circuit which translates the detected speed into an electrical parameter of characteristic value,
- facilities for translating each danger factor into an electrical parameter of like nature and with a conventional value,
- facilities for combining in a pre-determined manner the electrical parameters supplied by the facilities for translating each danger factor and the electrical parameter characteristic of the speed of the vehicle,
- a basic circuit comprising at least one flip-flop relay comparing the resultant of the combination with a predetermined threshold, and at least one warning device actuated by the flip-flop in the light of the said comparison.

BRIEF DESCRIPTION OF THE DRAWINGS

The invention will be easier to understand if reference is made to the description below concerning a non-limitative application method and to the attached drawings which form an integral part of this description.

DESCRIPTION OF PREFERRED EMBODIMENTS

In the example illustrated, the speed of the vehicle is translated into an electrical voltage to which are added, as and when different danger factors appear, voltages each of which has a value conventionally attributed to each of these danger factors for the purpose of comprising the resulting voltage with at least one predetermined voltage threshold to initiate the alarm when this resulting voltage exceeds the said threshold. The invention is not however limited to electrical voltages only, and the speed of the vehicle and the different danger factors may be translated into another parameter, electrical or otherwise, whose values corresponding respectively to the speed of the vehicle and to these different danger factors would be combined to obtain a resulting value to be compared with at least one pre-determined threshold so as to actuate at least one alarm in the light of this comparison. If electrical, this parameter could for example be a current or a frequency etc.; it would then be easy for a technician to set up in accordance with the principle of the invention the different electrical circuits to suit the selected parameter.

This parameter could also be of a character other than electrical such as optical, magnetic, radio-active, etc.

Figure 1:
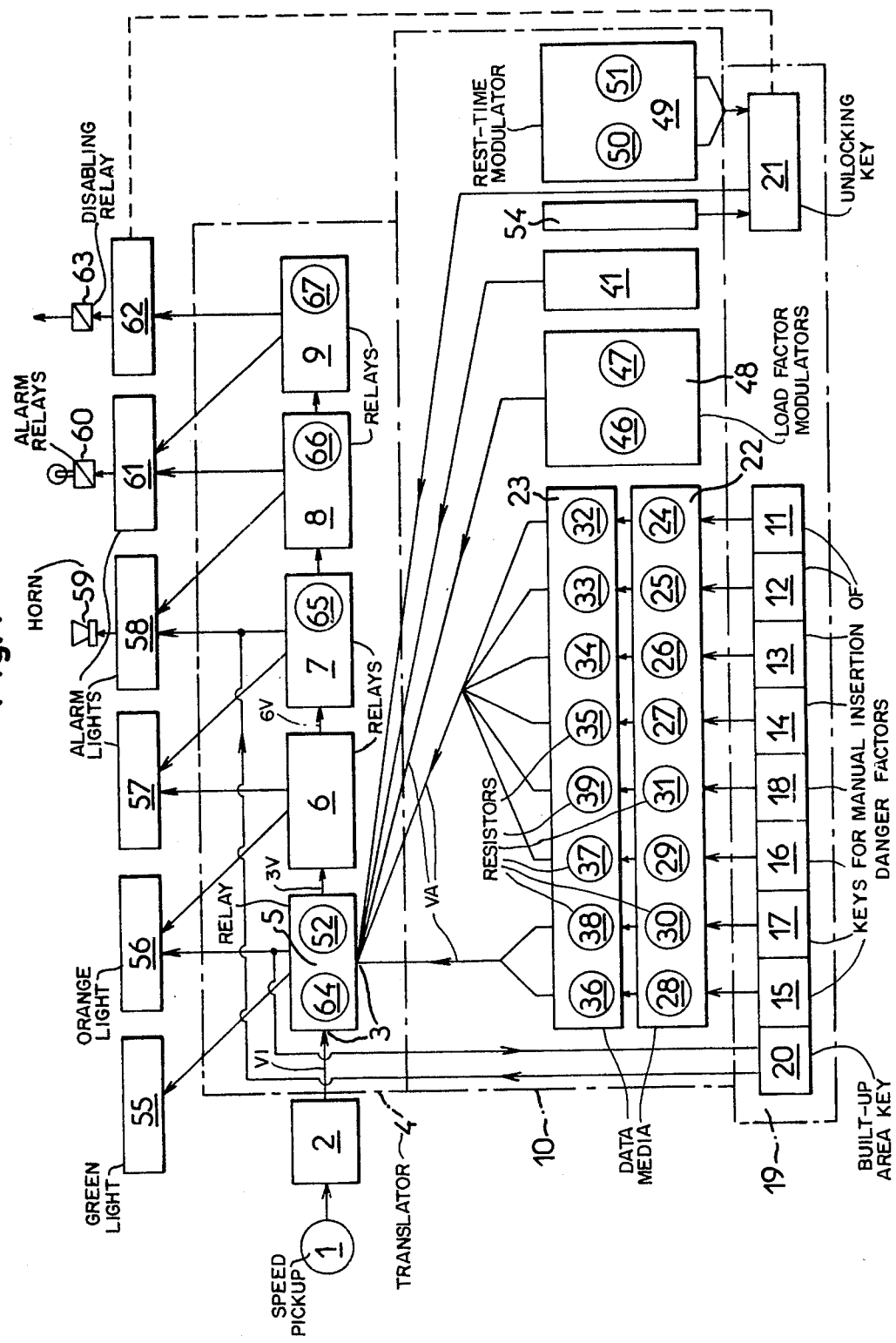
FIG. 1 is a synoptic diagram showing a remote-controlled embodiment of the invention which is also able to operate independently of the remote controls.
Figure 2:
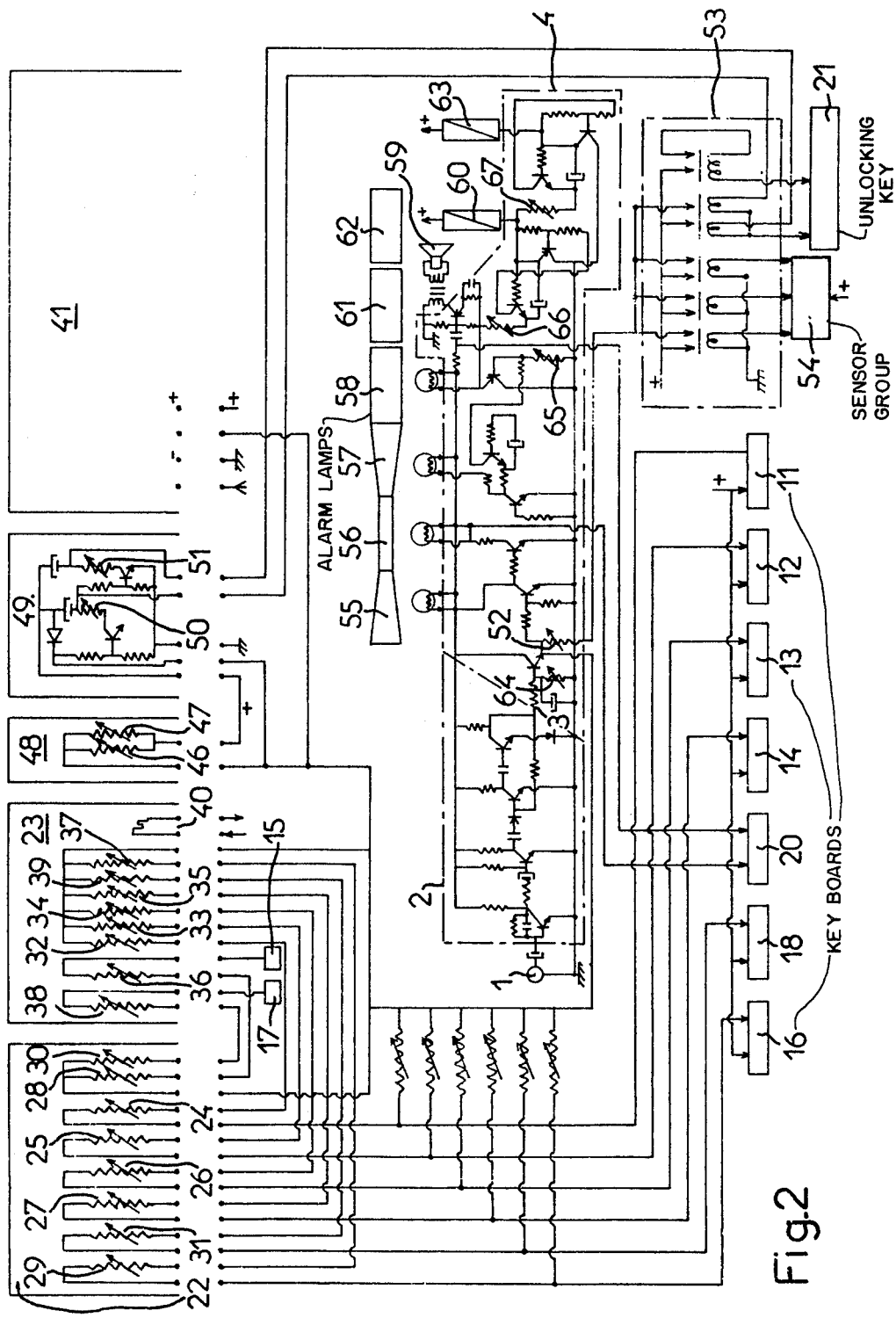
FIG. 2 is an electrical diagram showing the self-contained embodiment of the new device.

FIGS. 1 and 2 show in schematic form a specimen device according to the invention as fitted to a vehicle. Such device comprises a device which senses the speed of the vehicle at each moment and which consists for instance in a magnetic head 1 secured to the outside of the housing of the speedometer normally fitted to the vehicle and which picks up the eddy currents set up by the magnetized mass rotating inside that housing to transmit them to an electronic circuit 2 which transforms those currents into an electrical parameter characteristic of the speed, here for example into a voltage $V_1$ proportional to that speed.

The circuit 2 for translating the speed detected by the head 1 or by any other sensing device into the desired electrical parameter may be of any type known as such.

Here the voltage $V_1$ constitutes the basic parameter or data which is injected at an input 3 of a basic electronic circuit 4 consisting mainly of a cascade of flip-flop relays 5 to 9 of any known type, recting respectively to ever-increasing voltages as for instance 3V, 6V, 6.5V, 7V, 8.5V. The voltage $V_1$ is injected at the input of the first relay 5 where there are added the various complementary voltages supplied via associated circuits included in FIG. 1 under the blanket reference 10, the role of each being to translate a danger factor into a voltage with a conventional value. The unit is of course supplied by the vehicle battery, as indicated at + in FIG. 2.

The danger factors taken into account in the example illustrated are as follows, this list of course not being limitative:
- category of route followed: for example motorway, four-lane, three-lane or two-lane road;
- visibility conditions: for example night, fog
- weather conditions: for example rain (wet road), ice.

These different danger factors can for example be introduced manually, for instance by operating respectively the keys 11 to 18 of a keyboard accessible to the driver of the vehicle. This keyboard also comprises a key 20 corresponding to traffic in a built-up area and whose operation will be described later, and an unlocking device 21 which will likewise be described later.

Each of the keys 11 to 18, which could also be replaced by any equivalent device as could also the key 20, when actuated energizes from the vehicle battery a resitor or several resistors in series, the various resistors or series of resistors corresponding respectively to the different keys being interconnected in parallel and connected in parallel with the circuit 2 which translates the vehicle speed into voltage, to the input 3 of the first relay 5 so that the actuation of an increasing number of keys results in an increase in the voltage at the input of this relay 5. In other words, the appearance of a new danger factor results in a setting of the device so that the relay 5, and consequently all the successive relays 5 to 9, reacts to a lower voltage coming from circuit 2 and consequently for a lower speed of travel, thus causing the tripping of the successive alarms at speeds which are likewise lower.

In the example illustrated, the actuation of each key energises two adjustable resistors mounted in series, all the pairs of resistors in series being installed in parallel to the input 3 of the relay 5.

The two resistors whose energizing is thus controlled by each key make it possible, because of their adjustment facility, to modulate the voltage injected as a result of the actuation of the key in the light of the mechanical characteristics of the vehicle and its performance as it gets older, and more especially of its capacity to react favourably to the danger associated with the key, and in the light of the skill and physical condition of the driver faced with this specific danger, due account being taken of the results of periodic medical check-ups, of tests on a driving simulator, offences of a more or less serious nature committed by the driver over a given period, the extent of his driving experience, etc....

In the example illustrated, the different adjustable resistors corresponding respectively to the instantaneous characteristics of the vehicle and its driver are grouped respectively on two adjustable, removable and interchangeable data media 22 and 23, characteristics respectively of the vehicle and of the driver.

The medium 22 characteristic of the vehicle thus has, in the example illustrated, eight adjustable resistors 24 to 31 which can be energized respectively by keys 11 to 18, and the medium 23 characteristic of the driver also has eight resistors 32 to 39 connected in series respectively with the resistors 24 to 31, the different pairs of resistors in series so defined being parallel coupled downstream as stated earlier.

In the example as illustrated, the two media 22 and 23 are preferably in a form which can be plugged in on the basic circuit 4. Such a design in removable form offers numerous advantages.

A first advantage lies in the fact that it is possible to adjust separately the resistors of the two media, for example by means of the adjusting console which will be described with reference to FIG. 4, thus enabling:
- account to be taken separately of fluctuations in the vehicle potentials and the potentials of its driver;
- simple adaptation of the device fitted to a vehicle to the different possible drivers of that vehicle, each having his characteristic medium 23;
- provision to be made for additional thief-proofing, for example by fitting the media 23 characteristic of the different possible drivers of the same vehicle with a series of notches characteristic of that vehicle or with any equivalent device, the vehicle of course being fitted with an additional reading device to prevent it from being started by a driver who is not in possession of a card authorizing him to drive that vehicle (such a device has been shown schematically at 40 in FIG. 2, where the same references have also been used as those on FIG. 1 to identify identical parts); and
- providing, by locking of the media on the basic circuit in the event of accident, a rapid check to be made that the driver's papers agree with the characteristic medium inserted in the device, the driver's identity to be quickly established together with, where applicable, his emergency medical characteristics, and so on.

Preferably, the technical features of the vehicle such as its type and chassis number and the details of the driver such as his social security number, his driving licence number, his blood group and his identity are enetered for this purpose on the media 22 and 23 respectively.

While the use of plug-in media 22 and 23 seems preferable in the case illustrated where the modulation of the electrical parameter depending on the different danger factors is obtained by means of electrical resistances, it is also possible to envisage other types of data media, notably when this electrical parameter differs from a voltage, by using for example magnetic cards or cards with optical or mechanical reading facilities, etc...

The danger factors attributable to the nature or weight of the load carried by the vehicle can also be taken into account by injecting an additional parallel voltage at an input 3 of the relay 5. In this way it is possible to limit the speed of a vehicle either because its total laden weight reduces its road-holding and braking capacities or because the nature of the products carried calls for special precautions, as is the case where explosive, inflammable or toxic substances etc. are being carried.

The value of the voltage representing these dangers factors due to the load being carried is preferably modulated, as in the case of danger factors characterised by keys 11 to 18, by two resistors in parallel 46 and 47 interposed between the battery and the input 3 of relay 5 and adjustable respectively in the light of the nature and weight of the load. These two resistors are preferably grouped on the same medium 48 specific to the load carried and which is removable and interchangeable like the two media 22 and 23 specific to the vehicle and its driver respectively: it is thus possible to detach it from the basic circuit 4 of the instrument fitted in the vehicle and adjust it on the control console which will be described later with reference to FIG. 4, depending on the transport operation to be undertaken.

The medium 48 may for instance be of the plug-in type. It may of course be replaced by any device able to fulfil the same functions, notably when the parameter adopted is other than a voltage.

Such an adjustment in the light of the load being carried is mainly intended for certain public transport vehicles and heavy goods vehicles. It should be noted that this adjustment should also take into account any possible trailers involved.

In the particular case of such vehicles, provision has also been made in the invention for a device which takes into account those danger factors due to a difference between the vehicles running and stationary times and certain pre-determined time values, the object being more especially to do away with the practice of covering excessively long stretches without resting. This device comprises, preferably grouped on a separate medium 49 which is removable and interchangeable like the different characteristic media 22, 23 and 48 already mentioned, a time base of a known type, adjustable in a known manner by, for instance, the set of two adjustable resistors 50 and 51 setting respectively the maximum running time and the minimum resting time so as to inject at input 3 of relay 5, after an adjustable pre-determined running time, a voltage whose specific purpose is to compel the driver not to exceed a low ceiling speed, or "manoeuvring speed", which may be set by an adjustable resistor 52 of the first relay 5 and which may for instance be in the region of 20 km/hour.

As will be seen on FIG. 2, the time base does not directly inject this voltage at input 3 of relay 5 but, in the event of exceeding the pre-determined running times and during the rest times allowed for, energizes a relay 53 which itself causes this voltage injection.

This time base is introduced immediately on the appearance of a voltage V1 read at the basic circuit input and thus takes a charge proportional to the running time of the vehicle. After a certain charge time set by adjusting resistor 50, relay 53 is actuated and compels the driver to travel at manoeuvring speed or to stop his vehicle for a certain rest period set by adjusting the resistance 51; at the end of a pre-determined rest period, the time base permits the unlocking of relay 53 as will be described later and, after this unlocking, a a further pre-determined running time.

There also act on relay 53 various sensors, in this case three grouped under the reference 54, distributed over different sensitive points of the vehicle such as brakes, steering and, for instance, tires in the case of heavy vehicles with twin wheels and multiple axles, to compel the driver to slow down to a speed less than manoeuvring speed in the event of any technical fault affecting these various components. The list of these various components automatically monitored is of course in no way limitative.

Relay 53 is self-energized, but to allow the driver of the vehicle to resume his journey at normal speed after checking the nature of and repairing the fault when transition to manoeuvring speed has been controlled by the sensors 54, or at the end of the rest period allowed when the information originates from the time base 49, an easily accessible device 21 allows relay 53 to be unlocked.

Relay 53 may also be actuated to bring about a transition to manoeuvring speed when the vehicle is travelling at an actual speed far exceeding the ceiling speed determined scientifically by the device as per the invention as will be seen later, and the unlocking device 21 is preferably designed to be of a type whose proper handling requires the driver to be perfectly lucid, the object being notably to prevent a driver who has had too much to drink or who is feeling ill or over-tired from taking the wheel again to drive at a speed considered as normal in the light of the other target danger factors.

It should be noted that the use of sensors is in no way restricted to the detection of technical hitches, but that such sensors may also be used for example to determine the weight of the load being carried and impose lower speeds on a vehicle whose load is near to its maximum, impose manoeuvring speed on a vehicle whose load makes it unstable, or yet again detect certain weather phenomena such as ice or rain, by replacing the corresponding keys 18 and 17. It should also be noted that keys 15 and 16 corresponding respectively to the danger factors due to nightfall and rain can be easily replaced by connecting the supply to resistors 28-36 and 30-38 directly to the supply to the dimmer bulbs and windscreen wipers respectively.

The different danger factors which may be introduced manually by such keys as 11-18 can also be introduced automatically by remote control, the device as per the invention then comprising a receiving device, also of the plug-in type, which can electronically receive information as to the route conditions and translate it here into a voltage placed in parallel at input 3 of relay 5. This receiver may for instance be a radio receiver of known type as shown schematically on FIG. 3, comprising for example four elementary receivers 42 to 45 (FIG. 3) which are sensitive to different elementary items of information, in the form of a frequency for instance, and in the example illustrated transforming each of these elementary items of information into an output voltage, the different output voltages being placed in parallel to obtain the required voltage increase whenever a fresh danger factor makes its appearance.

To each elementary receiver 42 to 45 or to each combination of these receivers there corresponds, on the roadside, a type of emitter beacon fixed or otherwise which, when the vehicle enters the receiving zone prescribed, causes the injection at input 3 of relay 5 of an additional voltage specific to a danger factor, itself specific to the nature or configuration of the route being taken or of events such as the occurrence of a traffic hold-up, an accident, icing, fog, or any disturbance over the next few kilometers. It should be noted that additional information may be transmitted to given vehicles, depending on characteristics peculiar to those vehicles, in conjunction with axle-load, volume, width, length, height etc... detectors.

By adding the voltage V1 proportional to the speed of the vehicle to the additional voltages VA introduced as and when different danger factors appear when the route conditions vary, there is obtained a resulting voltage $V_E$ which constitutes the input voltage of the basic circuit 4.

Increasing with the speed of the vehicle, and as each additional danger factor appears, this voltage $V_E$ acts on the successive electronic relays 5 to 9 of the circuit 4 with the following effects:

when $V_E$ is less than the excitation voltage of the first relay 5, which is for example 3V as stated earlier, a green light comes on on the instrument dial immediately this is energised by operating the ignition switch and subsequent to the insertion of the medium 23 identifying the driver, the said medium having notches 40;

at a voltage $V_E = 3$ volts, the green light 55 goes out and an orange light comes on, indicating to the driver that he is travelling at the recommended cruising speed;

at a voltage $V_E = 6$ volts, which in the example corresponds to the excitation voltage of the second relay 6, a first red alarm light 57 located in the extension of the orange light 56 comes on in addition to this latter to indicate to the driver that his vehicle has reached the limit of the recommended speed range;

at a voltage $V_E = 6.5$ volts, the value which in the example illustrated in the tripping voltage of the third relay 7, a second red light 58 comes on with intermittent flashing and an audible alarm of any known type 59 is initiated in the vehicle, the frequency of the light flashes and the loudness of the sound increasing in proportion to the speed of the vehicle;

if the driver, travelling in town, has taken the precaution of pressing the "built-up area" key 20, the audible warning 59 and the lighting up of the danger lamp 59 occur simultaneously with the replacement of the green light of lamp 55 by the orange light of lamp 56 as a result of the action of relay 5, the "built-up area" key 20 causing the direct connection of the supply of the danger lamp 58 and of the audible warning 59 to the supply of the orange lamp 56;

at a voltage $V_E = 7.5$ volts, which in the example is the tripping voltage of the fourth relay 8, this latter energizes a relay 60 which lights up the outside lamps of the vehicle including the "warning" lights whose operation is displayed by an inside indicator lamp 61, the visual alarm 58 and the audible alarm 59 inside the vehicle continuing to function; drivers of other vehicles are thereby warned of the dangerous nature of any vehicle travelling at excessive speed;

at voltage $V_E = 8.5$ volts, there comes into play the fifth flip-flop 9 which energises, at the same time as an inside lamp 62, a relay 63 which trips a device causing the engine to misfire and/or the fuel supply to decrease; as a result, the vehicle is forced to slow down to manoevring speed which may for instance be set at under 20 km/h by the action of the adjustable resistor 52 of the first flip-flop 5. This relay 63 can be coupled to good effect with the self-energized relay 53 described earlier, the result being that the vehicle cannot again be driven at normal speed until the unlocking device 21, whose design is such that it requires the complete lucidity of the driver, has been properly manipulated.

Figure 4:
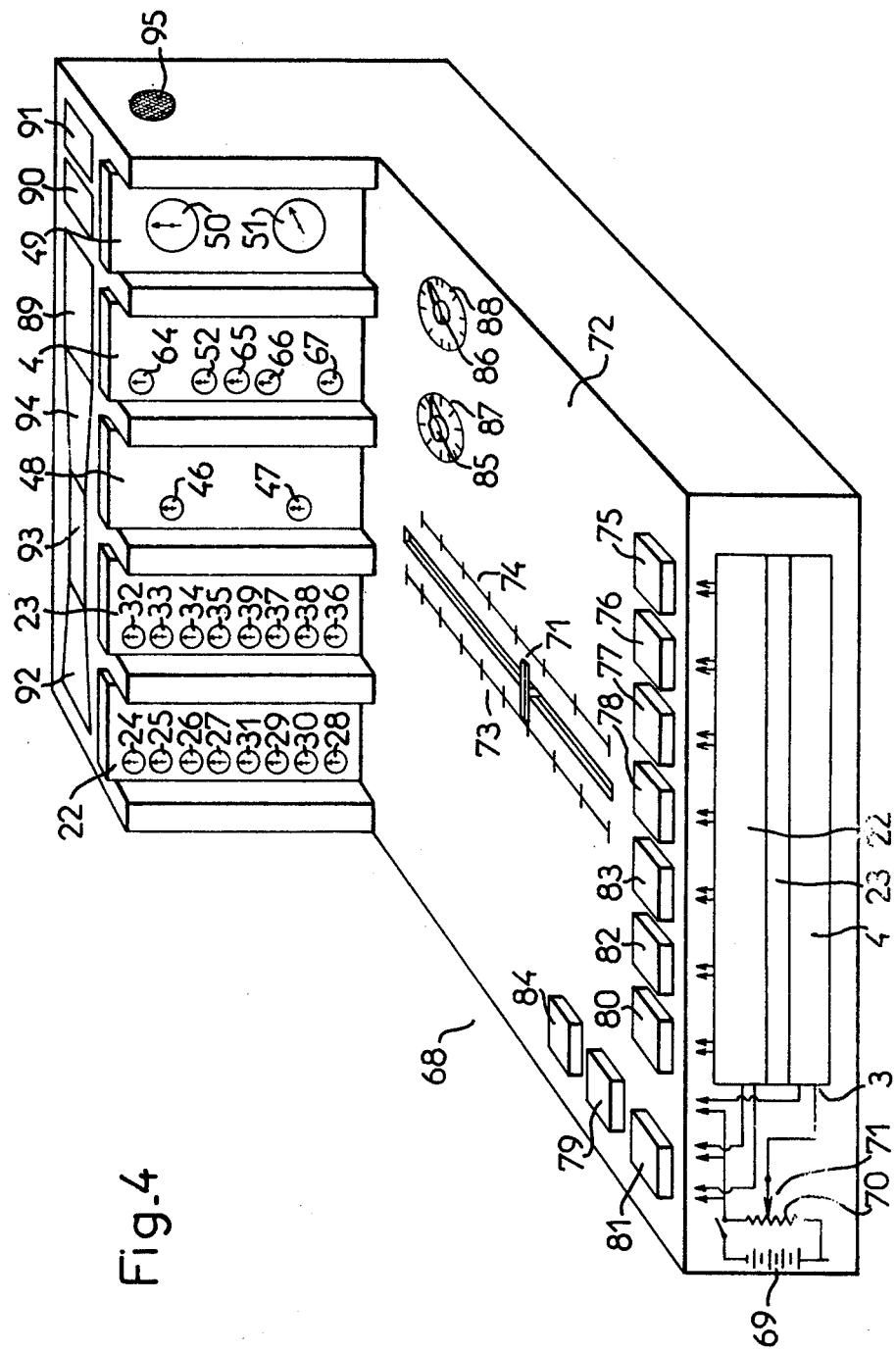
FIG. 4 gives a perspective view of a console for memorizing the different speed levels and adjusting plug-in data media of the device as per the invention, the console having a simplified illustration of its wiring diagram.

The maximum built-up area speed is fixed for example at 60 km/h by setting an adjustable resistor 64 of the first flip-flop 5, the speed limit considered as absolutely excessive for a given vehicle by an adjustable resistor of the third flip-flop 7, and the percentage speed increase causing respectively the lighting up of the outside lamps and motor misfiring with return to manoeuvring speed respectively by the adjustable resistances 66 and 67 of flip-flops 8 and 9 respectively as will be described later with reference to FIG. 4.

Under the optimum possible route conditions, namely on a motorway in daytime on a dry surface, the input voltage $V_E$ of the basic circuit 3 is provided solely by the information V1 coming from the magnetic head 1 and therefore proportional to the speed of the vehicle.

If under these conditions the driver travels at the recommended cruising speed which does not initiate the alarm procedure, all that is required is a change in route conditions to compel the driver to reduce his speed to avoid initiating the alarm procedure.

In effect, any change in route conditions likely to constitute an additional danger factor causes the injection at input 3 of basic circuit 4 of an extra voltage which is added to the voltage V1 proportional to the speed of the vehicle; with each extra voltage added, since the alarm tripping voltages are fixed, the only option open to the driver to avoid exceeding the voltages corresponding to the alarm initiation threshold is to decrease the voltage V1 and thus to reduce his speed.

The percentages of speed reduction corresponding to the appearance of the different danger factors and the speeds which should not be exceeded on each category of road under optimum driving conditions should logically be decided in conjunction with the testing services of the vehicle manufacturers and the road safety and traffic authorities. All the resulting speed levels for the different possible combinations of driving conditions, relayed to the driver by the lamps and alarms 55 to 63 over the entire itinerary of each, are memorized in the circuits of the device by means of the regulating console 68 which will now be described with reference to FIG. 4.

The purpose of this console is to plot in static form all the traffic conditions provided for by the device as per the invention.

It has a voltage supply 69 from which is taken, via a potentiometer 70, the voltage V1 proportional to the simulated speed; this voltage is injected at input 3 of the basic circuit 4, which is removed for this purpose from its housing fitted in the vehicle, and is plugged into its console 68 for setting while various removable media 22, 23, 48 and/or 49 also also plugged into console 68 and there connected to the basic circuit 4 under the same conditions as in the vehicle. Two media circuits have been shown on FIG. 4 with the same references 22, 23 as on FIGS. 1 and 2, different setting buttons being given the same references FIG. 4 as the components, in this particular instance resistances, used to adjust them. The slide 71 of a potentiometer 70 moves, for instance, over the top face of the console along a scale 73 showing the simulated speeds in km/h, from 0 to 180 km/h for example, and a scale 74 showing the percentages of speed reduction to be applied to each vehicle and each particular driver when setting the two media 22 and 23 for instance.

The console 68 also comprises a number of keys, each of which simulates the appearance of a danger factor or a change in category of road, each of these keys playing respectively an identical role to each of the keys of the keyboard 19 of the device installed in the vehicle: the console 68 comprises the keys 75 to 82 respectively playing the role of keys 11 to 20 of keyboard 19 and which, when actuated, bring about the same connections to simulate respectively traffic on a motorway, on a four-lane highway, a three-lane highway, a two-way highway, nightfall, driving in fog, rainfall, the appearance of icing conditions and traffic in built-up areas. On console 68 there is also a key 84 which simulates the need to drive at the manoevring speed imposed by the operating of relay 53 resulting from or other of the causes possible for actuating this relay.

To simulate the passage of time with a view to setting the time base 49, console 68 also has two devices of known type comprising simulation of resting time and simulation of travelling time, adjustable respectively by the action of two rotating knobs 85 and 86 which can move over clock dials 87 and 88 respectively.

Figure 5:
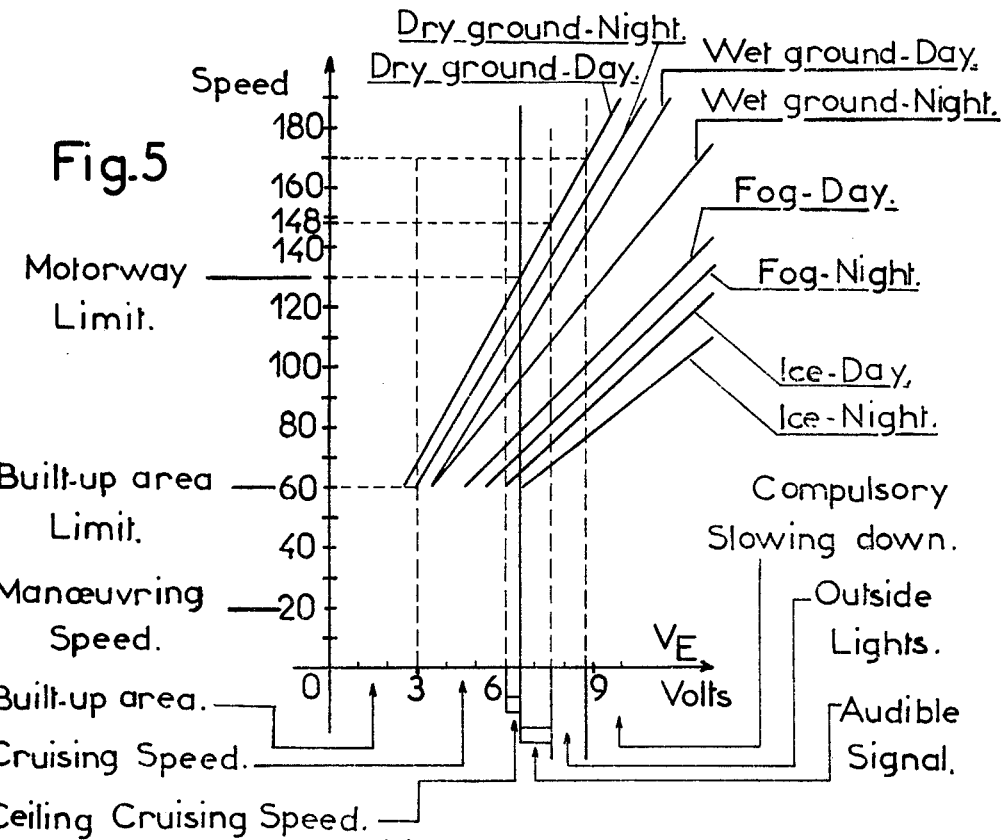
FIG. 5 shows a specimen graph prepared for a given vehicle to arrive at the speed level thresholds tripping the successive alarms, on a motorway for instance, and all the reductions in those levels corresponding to the different danger factors foreseen by the device.

In order to memorize by means of this console the different speed levels corresponding to the successive alarms, a chart (see FIG. 5) is prepared beforehand, showing for a given vehicle the speed level thresholds initiating the successive alarms, for instance in the case of driving on a motorway under optimum driving conditions where only the voltage proportional to the speed is injected into the basic circuit, and all the reductions in speed corresponding to all deteriorations in the traffic conditions allowed for by the device (FIG. 5).

Since the successive alarms always occur at the same voltages, all that is required to attain the speed level thresholds initiating those alarms is to bring the slide 71 to the calculated initiating speed shown on the chart and to set the corresponding adjustable resistor, on the circuit to be set so as to introduce at input 3 of the basic circuit 4 an additional voltage proportional to the proposed lowering of the alarm thresholds under each route condition; the console having corresponding alarm devices as noted hereafter.

Figure 3:
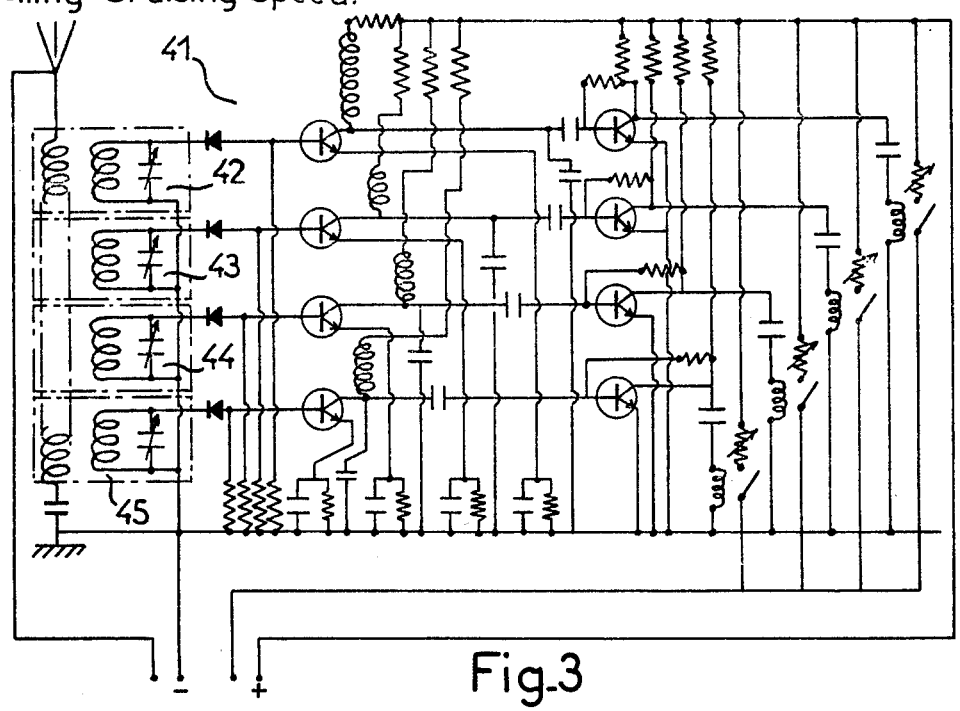
FIG. 3 shows a signal receiving medium capable of being plugged in on the embodiment of FIG. 2 to enable it to operate by remote control as in FIG. 1.

This adjustment will be easier to understand by referring to the following list of the different operations to be carried out when adjusting a complete device as illustrated in FIGS. 1-3 according to FIG. 5, the chart which, in the case of driving on a motorway, establishes the correspondence between the different voltage levels and the vehicle speeds at which the various alarms operate under different weather and visibility conditions, taking into account the fact that the ceiling speed in a built-up area is for instance 60 km/h. A table attached hereto and entitled "Table of Speed Levels" gives, in addition to the above, the similar correspondences which result therefrom in the case of each category of road in the light of the percentage of decrease in speed limits shown by way of example and to be determined by the competent authorities (the references shown in the margin of several lines of this table correspond to the different paragraphs of the regulating procedure described below.)

For the purpose of memorizing the proposed speed levels, by console 68, the standard basic circuit 4, the data media specific to the vehicle 22 and to the driver 23 respectively, and, notably in the case of public transport or heavy goods vehicles, the data medium specific to the load 48 and the time base medium imposing the alternating driving and rest periods, are detached from the device fitted in the vehicle.

After establishing the different speed levels to be memorised, based on the maximum speed limit allowed by law (130 kh/h on a motorway in the example illustrated) or on the ceiling cruising speed recommended by the vehicle manufacturer if this is less than this maximum permissible speed limit, and determined by the chart, FIG. 5, based on the percentages of reductions in speed inherent in the different forecast route conditions, the Table of Speed Levels shows all the speed thresholds initiating the alarms.

The following successive adjustments are then made:

(1) the manoeuvring speed, which is the travel speed of the vehicle when a sensor 54 is energised as a result of a mechanical fault or when the driver has exceeded the driving norms memorized in the device either by ignoring the successive alarms or by exceeding the maximum driving time memorized.

For this first adjustment, the slide 71 is moved to a speed higher than manouvring speed, the manoeuvring speed key 84 is depressed, simulating the energizing of the slowing-down relay 53; there then light up on the console 68 lamps 89 to 91 corresponding respectively to lamps 58, 61 and 62 of the device fitted in the vehicle which correspond respectively to "danger", "outside lamps switched on" and "initiation of the slowing-down mechanisms". The slide 71 is then moved to the ceiling manoeuvring speed to be memorized, 20 km/h for instance, the result being to inject into the basic circuit 4 a voltage $V_E$ corresponding to the same speed on the road, and the adjustable resistor 53 of the corresponding basic circuit is adjusted until the visual and audible alarms are cut out.

(2) The "built-up area" speed; for example 60 km/h. For this, the "built-up area" key 83 of the console is depressed, the first effect being to cancel out the "manoeuvring speed" key 84; this "built-up area" key 83 on the console corresponds to the "built-up area" key 20 of the device fitted in the vehicle. The slide 71 is then moved to the "built-up area" speed limit to be memorised, and the adjustable resistor 64 of the basic circuit 4 is adjusted until its green lamp 92, which had come on when key 83 was actuated, goes out, an orange lamp 89 and a winking red lamp 89 come on simultaneously, and an audible alarm is initiated via a loud-speaker 95 (the different lamps and alarms 92 to 94, 89 and 95 correspond respectively to lamps 55 to 58 and to the audible alarm 59 of the device fitted in the vehicle). For all the other speed levels memorised, the following procedure is adopted (see Table of Speed Levels):

(3) Press the "motorway" key 75, bring the slide 71 to the speed limit used as a basis for the chart corresponding to the vehicle to be equipped, for instance 130 km/h (FIG. 5). Adjust the corresponding adjustable resistor 24 of the associated plug-in circuit specific to the vehicle 22 until the visual and audible "danger" alarm 89–95 is obtained.

(4) Bring the slide 71 to the initiating speed of the relay 60 controlling the lighting up of "outside lights" as shown on the chart. Adjust the corresponding adjustable resistor 66 of basic circuit 4 until the lamp 90 simulating the energizing of the "outsight lights" relay comes on.

(5) Bring the slide 71 to the initiating speed of the relay 63 "slowing-down" mechanism. Adjust the corresponding adjustable resistor 67 of basic circuit 4 until lamp 91 simulating the energizing of the slowing-down mechanism actuating relay 63 comes on.

(6) Press the "night driving" key 79 simulating the lighting up of the vehicle dimmer bulbs without touching the "motorway" key which remains depressed. Move the slide 71 to the "motorway-night" speed limit as determined by the proposed decrease percentage in the light of the vehicle's electrical equipment and shown on the chart (FIG. 5). Adjust the corresponding adjustable resistor 28 of the associated plug-in circuit 22 "specific to the vehicle" until the visual and audible "danger" alarm 89, 95 is obtained.

(7) Press the "wet surface" key 81 simulating the switching on of the vehicle's windscreen wipers. The "motorway" key 75 remains unchanged. Move the slide 71 to the motorway "wet surface" speed limit shown on the chart. Adjust the corresponding adjustable resistor 30 of the associated plug-in circuit "mechanical characteristics" of the vehicle 22 until the visual and audible "danger" alarm 89,95 is obtained.

(8) Press the "fog" key 80, the "motorway" key remains unchanged. Move the slide 71 to the "fog" speed limit shown on the chart. Adjust the corresponding adjustable resistor 29 of the associated plug-in circuit "mechanical characteristics of the vehicle" 22 until the visual and audible warning "danger" 89, 95 is obtained.

(9) Press the "icy road" key 82; only the "motorway" key remains depressed. Move the slide 71 to the motorway "icy surface" speed limit shown on the chart. Adjust the corresponding adjustable resistor 29 of the associated plug-in circuit 22 "mechanical characteristics of the vehicle" until the visual and audible "danger" warning 89,95 is obtained.

(10) Press the "four-lane highway" key 76, all the other keys being inoperative (de-energized). Move the slide 71 to the "four-lane highway" speed level shown on the chart. Adjust the corresponding adjustable resistor 25 of the associated plug-in circuit 22 specific to the vehicle until the visual and audible "danger" alarm is tripped (89,95).

(11) Press the "three-lane highway" key 77. Move the slide 71 to the "three-lane highway" speed level shown on the chart or table. Adjust the corresponding adjustable resistor of the associated plug-in circuit 22 "specific to the vehicle" until the visual and audible "danger" alarm 89,95 is actuated.

(12) Press the "two-lane" highway key 78. Move the slide to the "two-lane highway" speed level shown on the chart or table. Adjust the corresponding adjustable resistor 27 of the associated plug-in circuit specific to the vehicle until the visual and audible "danger" alarm 89,95 is tripped.

(13) Press the "motorway" key 75. Move the slide 71 to the speed threshold initiating the visual and audible "danger" alarm 89,95. Move the slide 75 to a lower speed level depending on the weight of the vehicle's load; the alarm stops automatically. Set the adjustable resistor 47 until the visual and audible "danger" alarm 89,95 is once more obtained.

(14) Similarly, with the "motorway" key unchanged, move the slide 71 to a lower speed level depending on the nature of the load. Set the adjustable resistor 46 until the visual and audible "danger" alarm 89.95 is obtained.

(15) Move the pointer 86 of the time-interval meter for "maximum driving time" to the desired uninterrupted running time. Set the corresponding adjustable resistor 50 until the visual and audible "danger" alarm normal engine contact and so constituting an additional thief-proof device.

| | Category of road | % reduction in maximum speed due to the category of the road | Traffic conditions | % reduction due to traffic conditions | Visual + audible alarm above: | Lighting up of outside lights above : ditto + 15% | Initiation of slow-down device above : ditto + 30% |
|---|---|---|---|---|---|---|---|
| 3-4-5 | MOTORWAY | | DAY-DRY ROAD | | 130 km/h | 149 km/g | 170 kg/h |
| 6 | | | NIGHT-DRY ROAD | − 8% | 119 km/h | 136 km/g | 154 km/g |
| 7 | | | DAY-WET ROAD | −13% | 113 km/h | 129 km/h | 146 km/h |
| | | | NIGHT-WET ROAD | −21% | 102 km/h | 117 km/h | 132 km/h |
| 8 | | | FOG | −40% | 78 km/h | 89 km/h | 101 km/h |
| 9 | | | ICING | −50% | 65 km/h | 75 km/h | 85 km/h |
| 10 | 4-lane road | −10% | DAY-DRY ROAD | | 117 km/h | 135 km/h | 152 km/h |
| | | | NIGHT-DRY ROAD | − 8% | 108 km/h | 124 km/h | 140 km/h |
| | | | DAY-WET ROAD | −13% | 102 km/h | 117 km/h | 132 km/h |
| | | | NIGHT-WET ROAD | −21% | 93 km/h | 107 km/h | 121 km/h |
| | | | FOG | −40% | 70 km/h | 80 km/h | 91 km/h |
| | | | ICING | −50% | 59 km/h | 68 km/h | 77 km/h |
| 11 | 3-lane road | −20% | DAY-DRY ROAD | | 104 km/h | 120 km/h | 135 km/h |
| | | | NIGHT-DRY ROAD | − 8% | 96 km/h | 110 km/h | 125 km/h |
| | | | DAY-WET ROAD | −13% | 90 km/h | 104 km/h | 117 km/h |
| | | | NIGHT-WET ROAD | −21% | 83 km/h | 94 km/h | 107 km/h |
| | | | FOG | −40% | 62 km/h | 71 km/h | 81 km/h |
| | | | ICING | −50% | 52 km/h | 60 km/h | 68 km/h |
| 12 | 2-lane road | −30% | DAY-DRY ROAD | | 91 km/h | 105 km/h | 118 km/h |
| | | | NIGHT-DRY ROAD | − 8% | 84 km/h | 97 km/h | 109 km/h |
| | | | DAY-WET ROAD | −13% | 79 km/h | 91 km/h | 103 km/h |
| | | | NIGHT-WET ROAD | −21% | 72 km/h | 83 km/h | 94 km/h |
| | | | FOG | −40% | 55 km/h | 63 km/h | 72 km/h |
| | | | ICING | −50% | 46 km/h | 53 km/h | 60 km/h |

89,95 is actuated. At this point, with the alarm still operating, move the pointer of the "minimum rest period" time-interval meter (85) to the proposed minimum stopping time. Set the corresponding adjustable resistor 51 until the visual and audible "danger" alarm 89,95 ceases to operate.

(16) On the basis of the speed levels already memorized in the light of:
the category of the road: motorway, four-lane, three-lane or two-lane road,
visibility: nighttime, fog,
weather conditions: wet or icy surface,
where applicable, the load and nature of the load, etc.
it is also possible to regulate, solely by way of reduction, the speed levels to be memorized in the light of the skill, competence and physical condition of the driver by settings 3 to 12 for which the corresponding adjustable resistors will be found in the associated plug-in circuit 23 "capabilities and physical conditions of the driver".

This associated plug-in circuit 23 specific to the driver thus becomes a veritable "data medium key" bearing the driving license number of the user of the vehicle.

The same vehicle with its speed levels memorized will indicate different speed levels depending on the driver of the vehicle.

This "data medium key" specific to the competence and physical condition of the driver may be made indispensible for starting the vehicle, the insertion of this key into the device setting up a contact in series with the normal engine contact and so constituting an additional thief-proof device.

Provision may be made for this "magnetic key" data medium specific to the driver to be locked in its housing in the event of a violent collision.

In the second version of the device, FIG. 3, this has an additional circuit 41 which receives signals from BEACONS installed over the entire length of roads, as for example:

type A beacons emitting signals (whose frequency gives the reduction percentage) which, following reception, amplifying and selection, provide automatically in the form of additional voltage injected at input 3 of basic circuit 4, the reduction percentage corresponding to the route being followed;

type B beacons emitting signals (differing from signals A) whose effects are added to those of signals A and which are received, amplified and selected by the receiving circuit 41 of the device which gives automatically, in the form of additional voltage injected at input 3 of basic circuit 4 reduction percentages which take into account the configuration of the route being followed; these reduction percentages automatically give recommended speed levels enabling the driver to tackle under optimum speed conditions all stretches of road calling for slowing down : bends, crossroads, level crossings, stretch of built-up area, black spots, departures from the level, etc..

type C beacons emitting signals (differing from signals A and B but whose effects are added to those of these latter), received, amplified and selected by the receiving circuit of the device and which uatomatically give, in the form of additional voltage injected at input 3 of basic circuit 4, speed reduction percentages which take into account exceptional traffic hazards such as icing, fog, strong winds, storms, road flooding, damaged surfacing. roadworks, accidents holding up traffic, abnormal traffic density, etc...

The signals, leading to reductions in norms proportional to the desired slowing down, allow traffic to flow safely.

It should be noted that the road control services can briefly emit signals for complete slowdown for the sole purpose of monitoring the proper working of the devices fitted to vehicles.

The receiving circuit 41 fitted to the device as per the invention may also receive a fourth frequency providing for the direct transmission of messages from traffic and road safety authorities.

The basic circuit, different alarms and associated plug-in circuits previously described are only one example of an application based on the techniques of transistorized circuits; the same goes for the setting console. It goes without saying that the invention is in no way limited to such a mode of application and that more especially it is already possible to achieve the same results with integrated circuits and data media other than plug-in circuits, as for instance magnetic cards specific to the vehicle, its driver etc... respectively; the device mounted in the vehicle and the memorizing console comprise of course the appropriate devices for taking readings and modifying characteristics.

It is further possible, whatever the design of the device as per the invention, to fit this with ancillary devices such as, for example, an indicator light outside the vehicle, fitted for instance on the windscreen or quarter-light, indicating in manual mode that the road category key 11 to 14 operated corresponds in fact to the category of road being driven on in order to show other users and the road safety patrols whether the driver has in fact selected or not the key corresponding to the category of road being used.

The authorities responsible for road traffic may even code the signposts marking routes, their geometric shape and/or colour determining the speed levels allowed. The keys and the indicator lamps outside the vehicle will then correspond to the coded shapes or colours.

It also goes without saying that the number of danger factors likely to intervene and which the device as per the invention is able to take into account is in no way restricted merely to the examples quoted.

I claim:

1. Method of indicating operational conditions, including speed levels, in motor vehicles, comprising the steps of;
    deriving from a speed of a vehicle a first signal indicative of the speed;
    determining whether danger factors are present and if so, driving from each an additional signal of a nature similar to a nature of the first signal and having a predetermined value, modulating each additional signal in accordance with safety factors dependent on characteristics of the vehicle and on characteristics of a driver for the vehicle;
    combining the first signal with the modulated additional signals to obtain a combined value;
    comparing the combined value with a pre-determined threshold; and actuating an alarm in response to the comparison, when the value compared with the threshold exceeds the threshold.

2. Method according to claim 1 in which the transforming of speed and of danger factors is performed to provide the first and the additional signals as electrical signals, and the modulating, combining, comparing and actuating steps are performed electrically.

3. Method according to claim 2 in which the modulating of the additional signals is performed according to mechanical characteristics of the vehicle, performance data thereof, and the vehicle's age.

4. Method according to claim 2 in which the determining of danger factors includes determining weather and visibility factors.

5. Method according to claim 2, in which the determining of danger factors includes determining factors corresponding to a nature and configuration of a route.

6. Method according to claim 2 in which the determining of danger factors includes determining factors corresponding to a load of the vehicle.

7. Method according to claim 2 in which the determining of danger factors includes determining a factor corresponding to a traffic incident.

8. Method according to claim 2 in which the determining of danger factors includes determining a factor corresponding to a difference between running and rest times of the vehicle and pre-determined times.

9. Method according to claim 8 including providing a time base in the vehicle, and in which the combining of the additional signals with the first signal is performed in response to time data supplied by the time base.

10. Method according to claim 1 in which the combining of the first and additional signals is performed manually.

11. Method according to claim 1 in which the combining of the first and additional signals is performed automatically in response to operating characteristics of mechanisms of the vehicle.

12. Method according to claim 2 in which the combining of the first and additional signals is performed automatically in response to factors, such as road conditions, electronically transmitted to the vehicle from outside the same.

13. Method according to claim 2 wherein each of the electrical signals is a voltage, the combining thereof being performed by adding the voltages to one another.

14. Method according to claim 1 in which the modulating of each additional signal is performed in accordance with a safety factor including a physical and mental condition of a driver of the vehicle.

15. Device for indicating operational conditions, including speed levels, in a motor vehicle, comprising;
    a speed circuit for deriving from a vehicle's speed an electrical signal having a value corresponding to the speed of the vehicle;
    means for determining whether danger factors are present and for deriving from each determined danger factor an electrical danger signal of a predetermined value corresponding to the respective danger factor;
    means for modulating each derived danger signal in accordance with a safety factor dependent on characteristics of the vehicle and on characteristics of a driver for the vehicle;

means for combining the modulated electrical danger signals with the electrical signal corresponding to the vehicle's speed into a resilient value;

a comparing circuit including a flip-flop relay for comparing the resultant value with a pre-determined threshold; and a warning system actuatable by the relay upon the comparison, for indicating a danger existing at the danger existing at the detected speed.

16. Device according to claim 15 in which the means for modulating the electrical danger signals comprises an adjustable data medium which is removable from the vehicle.

17. Device according to claim 15 in which the means for deriving and modulating danger factors includes elements for modulating the electrical danger signals according to a condition of a driver of the vehicle, the elements comprising an adjustable, removable and interchangeable data medium specific to the driver and indicative of the condition.

18. Device according to claim 17 in which the data medium comprises means for identifying the driver.

19. Device according to claim 18 in which the data medium comprises means for locking it in the vehicle.

20. Device according to claim 15 including means for converting weather danger factors and visibility conditions into a danger signal for combining it with the other danger signals.

21. Device according to claim 15 in which the means for determining danger factors includes means for determining such factors related to a nature and configuration of a road.

22. Device according to claim 15 in which the means for determining danger factors includes a load means for determining such factors related to a load of the vehicle.

23. Device according to claim 22 in which the load means comprises a separate, removable and interchangeable medium specific to a load being carried.

24. Device according to claim 15 in which the means for determining danger factors includes means for determining such factors related to a traffic incident.

25. Device according to claim 15 in which the means for determining danger factors includes an element for determining such factors related to a difference between running and rest times adopted for the vehicle and corresponding predetermined times.

26. Device according to claim 25 in which the element includes an adjustable time base for providing a corresponding danger parameter at pre-determined times.

27. Device according to claim 26 in which the time base comprises an adjustable, separate, removable and interchangeable medium responsive to a speed of traffic around the vehicle.

28. Device according to claim 15 in which the means for determining danger factors includes a keyboard having keys for selecting respective danger factors.

29. Device according to claim 15, in which the means for determining danger factors comprises data detectors distributed over the vehicle for detecting corresponding danger factors.

30. Device according to claim 15 in which the means for combining the signals includes a receiving device for receiving information relating to route conditions and for converting such information into one of the danger signals.

31. Device according to claim 15 in which the circuit for deriving the signal corresponding to speed and the means for determining danger factors are constructed to produce the corresponding electrical signals as voltages, the means for combining the signals including means for adding the voltages to one another and the comparing circuit having a relay for comparing a sum of the added voltages with a pre-determined voltage corresponding with the threshold, and the warning system being actuated by the relay when the sum of voltages exceeds the predetermined voltage.

32. Device according to claim 31 in which the means for determining danger factors and for deriving danger signals include corresponding resistors and means for placing the resistors in parallel with each other.

33. Device according to claim 32 in which one of the resistors comprises several resistor elements disposed in series with one another and adjustable respectively in accordance with technical features of the vehicle and with a condition of a driver of the vehicle for the modulating of the danger signals.

34. Device according to claim 33 in which the resistor elements are mounted as a separate, removable and interchangeable medium.

35. Device according to claim 32 in which the resistors include a resistor element corresponding to a load of the vehicle.

36. Device according to claim 35 in which the resistor element is mounted as a separate, movable and interchangeable medium.

37. Device according to claim 36 in which the medium has relays and alarm circuits associated therewith.

38. Device according to claim 37 in which one of the relays and alarm circuits has means for energizing a visible signal on the vehicle.

39. Device according to claim 38 in which the visible signal comprises alarm lights for the vehicle.

40. Device according to claim 37 in which one of the relays and alarm circuits has means for energizing a horn of the vehicle.

41. Device according to claim 37 in which one of the relays has a circuit for effecting compulsory slowing down of the vehicle when the speed exceeds the threshold.

42. Device according to claim 41 in which the circuit has means for automatically locking itself when energized, the vehicle having means for unlocking the circuit which means can be operated only by a person who is perfectly lucid.

43. Device according to claim 15 including a device for detecting speed, having a rotor movable at a rotary speed proportional to that of the vehicle, and means for detecting a rate of rotation of the rotor for the deriving of the corresponding signal.

44. Device according to claim 15 in which the circuit for deriving a signal corresponding to speed and the means for deriving danger factors are constructed to produce the electrical signals as voltages, the means for combining the electrical signals being constructed to add together the voltages representing respectively each danger factor and the speed of the vehicle.

45. Device according to claim 28, in which the keyboard has means visible from outside the vehicle to indicate selection of a key corresponding to a danger factor.

46. Apparatus for adjustably setting operational conditions of a device in a vehicle for indicating the vehicle's operation with respect to such conditions, the device having removable and interchangeable media for controlling corresponding speed and danger factors, the apparatus comprising;

a console;

means thereon for plugging onto the console a medium, removed from a device for controlling speed and danger factors for a vehicle;

means on the console for simulating different speed and danger factors and correspondingly adjusting the controlling of the speed and danger factors; and means on the console for determining safety factors, dependent on characteristics of the vehicle and of a driver, and for correspondingly controlling the adjusting means.

* * * * *